United States Patent
Niesen

Patent Number: 5,936,669
Date of Patent: Aug. 10, 1999

[54] METHOD AND SYSTEM FOR THREE-DIMENSIONAL COMPRESSION OF DIGITAL VIDEO SIGNALS

[75] Inventor: Joseph W. Niesen, La Mirada, Calif.

[73] Assignee: TRW Inc., Redondo Beach, Calif.

[21] Appl. No.: 08/848,000

[22] Filed: Apr. 25, 1997

Related U.S. Application Data

[62] Division of application No. 08/621,855, Mar. 25, 1996, abandoned.

[51] Int. Cl.$^6$ .................................................. H04N 7/12
[52] U.S. Cl. ........................ 348/401; 348/405; 348/407
[58] Field of Search ................................. 348/403, 384, 348/390, 400, 404, 405, 415, 420, 401; H04N 7/12

[56] References Cited

PUBLICATIONS

The MPEG standard (www.crs4.it/~lugi/mpeg/mpeg2.html).
MPEG–2 FAQ version 3.7 (May 11, 1995); by Chad Fogg (efogg@chromatic.com).
Pennebaker & Mitchell JPEG: Still Image Data Compression Standard, Chapter 4—*The Discrete Cosine Transform (DCT)* —(1993).
Visual–Psychophysics, *Digital Pictures: Representation and Compression* Chapters 3 and 4—Netravali & Haskell (1988).
IEEE Transactions on Electromagnetic Compatibility, vol. EMC–18, No. 1, Feb. 1976.
IEEE Transactions On Image Processing, vol. 3, No. 5, Sep. 1994 Entitled *Three–Dimensional Subband Coding with Motion Compensation* by Jens Rainer Ohm, Member, IEEE.
IEEE Transactions On Image Processing, vol. 3, No. 5, Sep. 1994 Entitled *Multirate 3–D Subband Coding of Video* by David Taubman and Avideh Zakhor.

*Primary Examiner*—Tommy P. Chin
*Assistant Examiner*—Y. Lee
*Attorney, Agent, or Firm*—Michael S. Yatsko

[57] ABSTRACT

Methods for compressing digital video signals that fully utilize temporal compression techniques. Each of the methods disclosed compresses digital video signals not only in the spatial domain, as with current implemented MPEG compression methods, but also in the temporal domain. A group of video signals is input to a signal compressor (16). The signal compressor (16) performs discrete cosine transforms in both the spatial and temporal domain. The transformed data is then input into a three-dimensional quantization matrix (18), where rate and distortion optimization parameters are calculated for compression purposes. In a first method, rate-distortion performance and transmission order are optimized for the quantized, three-dimensional transform coefficients. In a second method, rate-distortion performance is optimized for the quantized, three-dimensional transform coefficients. Temporal dequantization and inverse transform are performed before transmitting the two-dimensional transform coefficients in MPEG-compatible intraframe format. The data is transmitted to a signal decompressor (40).

6 Claims, 5 Drawing Sheets

METHOD AND SYSTEM FOR THREE-DIMENSIONAL COMPRESSION OF DIGITAL VIDEO SIGNALS

This is a divisional of U.S. patent application Ser. No. 08/621,855, filed Mar. 25, 1996 abandoned.

BACKGROUND OF THE INVENTION

1. Technical Field

This invention relates generally to digital video signal compression, and more particularly to methods of three-dimensional digital video signal compression that exhibit a high compression ratio, minimal signal distortion and a low transmission rate.

2. Discussion

Present video applications require large amounts of data to be transmitted at high bit rates and with a minimal amount of signal distortion. For example, the uncompressed data bit rates for monochrome digital video, such as VCR-grade v-deo (SIF), broadcast television video (CCIR-601) and high definition television (HDTV) are 16 Mbps, 67 Mbps, and 240 Mbps, respectively. In an uncompressed state, these data bit rates are too high to allow such video signals to be transmitted and processed in a commercially feasible manner. Therefore, in order to process such video signals in a practical manner, such video signals must be compressed prior to being transmitted.

In response to the proliferation of video based applications and products, an industry wide need for creation of a standard video signal compression syntax arose. A group under the International Standards Organization (ISO), known informally as the Moving Pictures Experts croup (MPEG), was formed to define standards for digital video and audio compression. Subsequently, the MPEG has created a standardized syntax by defining the content of a compressed video signal bit stream and the method of decompressing the bit stream subsequent to its transmission. The methods of compression, however, have not been defined, thus allowing individual manufacturers to develop various methods of actually compressing the data bit stream within the defined standards.

MPEG has to date defined two syntaxes widely used in the digital videos industry. A syntax known as MPEG-1 was defined to be applicable to a wide range of bit rates and sample rates. Particularly, MPEG-1 is suitable for use in CD/ROM applications and other non-interlaced video applications having transmission rates of about 1.5 Mb/s. A second syntax known as MPEG-2 was defined for representation of broadcast video, and other video signal applications having coded bit rates of between 4 and 9 Mb/s. MPEG-2 syntax is also applicable to applications such as HDTV and other applications requiring efficient coding of interlaced video.

While the above discussed MPEG-1 and MPEG-2 syntaxes exhibit adequate performance characteristics, the ongoing evolution of digital video dictates the need for further advancement in the art, as the present MPEG video syntax definitions do have associated limitations. For example, temporal redundancy, a phenomenon which can be used to enhance video compression by minimizing data bit rate Transmission for temporarily non-changing video pixels, is an efficient method of maximizing video signal compression. Present MPEG-1 and 2 data compression-based methods utilize temporal compression. However, the MPEG-1 and 2-based temporal compression is based on a frame by frame judgment basis so that the methods do not take full advantage of temporal compression. In particular, commercially standard MPEG-1 and MPEG-2 syntaxes partially only utilize temporal redundancy. In addition, present MPEG syntax requires numerous optimization options (such as predictive frame, bi-linear frame and intraframe variables) to be calculated, transmitted and then decoded by MPEG signal aggressors. The use of these numerous variables adds both computational time and complexity to the data compression. Also, while many current MPEG implemented syntaxes exhibit an associated bit rate compression of as high as 30:1, increasingly complex and data-intensive video applications require higher compression rates for real-time processing. Although data compression methods claiming compression ratios as high as 200:1 do exist, such methods subsample an array of pixels in a video frame sequence (i.e., throw away every other pixel) and utilize other shortcuts to achieve high compression.

With the ever increasing need to achieve higher bit rate transmission, there is a need for a video signal data compression method that exhibits a lower transmission rate than present MPEG-1 or MPEG-2 standards by achieving a higher compression ratio through more complete utilization of temporal redundancy than is presently utilized by MPEG 1 and 2-based standards. At the same time there is a need for a data compression method that is less computationally complex than current methods and that is compatible with currently implemented video systems conforming to MPEG-1 and MPEG-2 standards.

SUMMARY OF THE INVENTION

In accordance with the teachings of the present invention, two methods of compressing a digital video signal are provided. Both methods exhibit higher compression ratios than current MPEG standards, while at the same time are less computationally intensive. In particular, the video signal compression methods of the present invention utilize a temporal dimension quantization vector in addition to the standard MPEG two-dimensional spatial quantization matrix to optimize the compression rate with an associated signal distortion that is unobservable to the human eye. Both methods may be adapted for use in an MPEG compatible format, thereby allowing the methods to be used with current digital video signal applications.

In the inventive approach, a first method is provided for compressing a digital video signal. The method includes the step of providing a compressor for performing video signal data compression operations. A video signal is received at the compressor and includes spatial and temporal data from a plurality of video signal frames. The compressor conditions the spatial and temporal data for data quantization and then quantizes the conditioned data such that the transformed spatial data is associated with the transformed temporal data. An optimal transmission rate and signal distortion level is then determined from the quantized data. The transformed spatial data is subsequently disassociated from its ordering to the transformed temporal data before the mix of transformed spatial and temporal data is formatted into a matrix in a zig-zag configuration block for data transmission.

A second method of data compression is also provided. The second method provides a signal compressor for performing video compression operations. Video signal data including a plurality of video frames is input into the signal compressor. The compressor performs three-dimensional transformation of the video signal data from spatial and temple position domains to a three-dimensional frequency domain. The compressor then creates a plurality of three-dimensional quantization matrices, with each matrix containing quantization coefficients corresponding to transform data from one temporal frequency in the video signal. Each of the plurality of quantization matrices includes a third dimension in which, for each temporal frequency, a temporal quantization vector component is associated with each of the quantization coefficients. The compressor then calculates maximum transmission rate and optimal signal distortion parameters for the video frame from the data in the quantization matrices. The optimally quantized data is dequantized in the temporal dimension and inverse temporally transformed (one-dimensional transform). The resulting spatial transform is zig-zag ordered and transmitted per MPEG convention.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

Figure 1A:
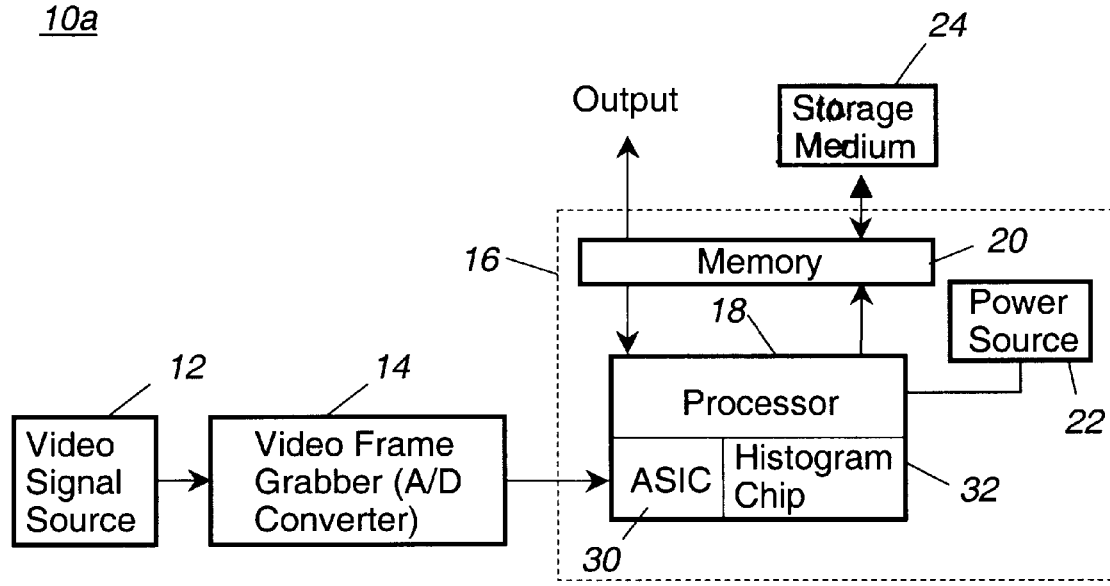
FIGS. 1a and 1b are block diagrams for the signal compressor and decompressor, respectively, in which the signal compression methods of the present invention are implemented.
Figure 1B:
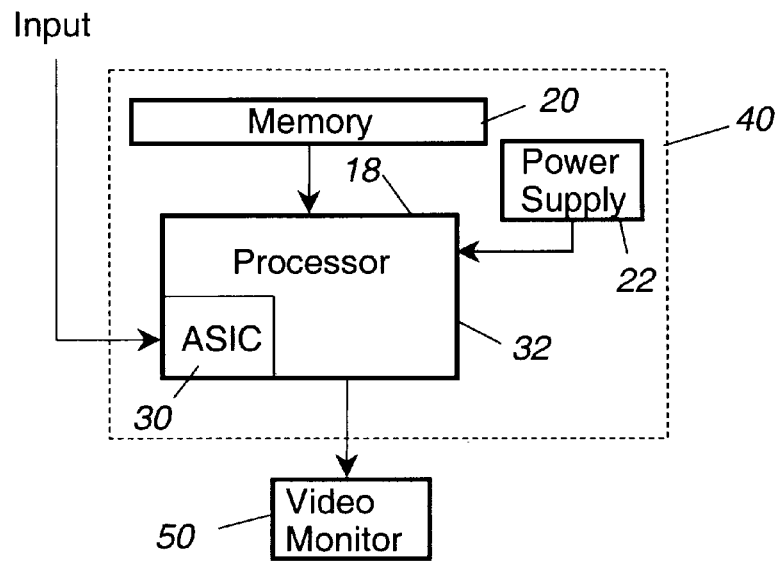

Referring generally to FIGS. 1a–1b, a system in which the preferred embodiment of the present invention is implemented as shown generally at 10a and 10b. In this system, one of the high compression data methods according to the present invention may be implemented. These data compression methods utilize temporal compression implemented through use of a three-dimensional quantization matrix. The methods of the present invention add a third temporal dimension to the two-dimensional spatial quantization matrix. A temporal quantization vector multiplies she coefficients in the MPEG two-dimensional spatial matrix representing a frame of data. By adding a temporal domain dimension to the MPEG spatial coefficient matrix, the variables associated with rate/distortion optimization calculations in previously mentioned MPEG-based data compression methods, such as predictive, bi-linear, and intraframe variables, are eliminated, as the temporal quantization value is the only variable necessary for calculating rate/distortion optimization parameters in the compression method of the present invention. As a result, compression method and system complexity is greatly reduced and the data compression ratio is greatly increased when compared to present MPEG-based data compression methods.

Referring in particular to FIG. 1a, the video signal is generated at a video signal source 12. It is contemplated that this video signal source could be any source of a digital video signal, or an analog video signal that may be later converted to digital through means such as an analog-to-digital video frame grabber 14. Such a video signal source may include, but is not limited to, a video cassette recorder (VCR), a CD ROM, broadcast television signal generator, a high definition television signal generator, or any type of computer network application or other real-time digital video source. The digital video signal generated from the video signal source 12 and/or the video frame grabber 14 is then input into a signal compressor, indicated generally at 16. The signal compressor includes a processor 18, a memory 20, and a power source 22. Also, an external storage medium, such as a central hard drive 24, may be operatively connected to the CPU to add further computation and memory capabilities to the compressor.

Preferably, the above described signal compressor is implemented via a Sun Sparc 10 Workstation. However, it should be appreciated that other computers, such as an IBM or IBM compatible personal computer having a Intel Pentium® processor chip or any other processing unit having equivalent processing capabilities can also be utilized to implement the data compression methods of the present invention. The methods of the present invention may be implemented using ANSI C programming language. However, it should also be appreciated that any other computer language capable of implementing the present methods may be used.

In addition to the processor 18, the signal compressor also includes an application specific integrated circuit (ASIC) 30 for performing discrete cosine transforms (DCT) in accordance with the preferred methods of the present invention as will be described below. Additionally, the signal compressor 18 also includes a histogram chip 32 for forming histograms for data transmission purposes, as will also be described in detail below.

Referring to FIG. 1b, a signal receiver is shown generally at 10b. The signal receiver includes a signal decompressor, shown generally at 40. As with the signal compressor, the decompressor may be a Sun Sparc 10 Workstation, an IBM personal computer with an Intel Pentium® processor, or any other processing unit having similar processing capabilities. It should be appreciated that the compressor and the decompressor may in fact be the same processing unit. The decompressor includes a processor 42 for performing inverse transforms to reconstruct the compressed video frames transmitted from the signal compressor 16. Specifically, an ASIC 44 is implemented to perform these inverse transforms. The processor 42 also includes a memory 46 and a power supply 48, of the type well known in the art. A video monitor 50 is also connected to the processor 42 for displaying the transmitted, reconstructed video frames. The video monitor is of the tone well known in the art and may be a television, a computer display, or any other commercially available pixel-based video screen.

Figure 2:
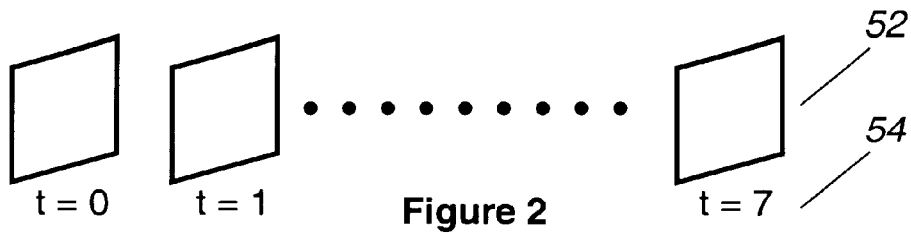
FIG. 2 illustrates a group of video frames in sequence containing data to be compressed by the data compression methods of the present invention.

Referring to FIG. 2, a sequential group of video frames generated by the video signal source 12 is shown generally at 52. Each of the video frames represents a temporally successive arrangement of pixels, as indicated by the time designations T=0, T=1, etc. at 54 and as is well known in the art. In accordance with the methods of the present invention, pixel data contained in each video frame is transformed, through a two-dimensional discrete cosine transform (DCT) function by the ASIC from a spatial position domain to a spatial frequency domain.

Figure 3:
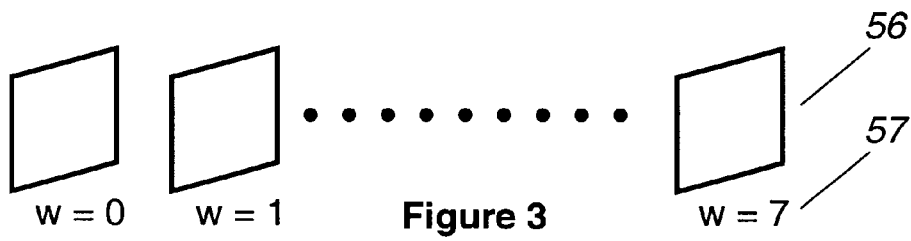
FIG. 3 illustrates a sequence of two-dimensional transform frames subsequent to a discrete cosine transform being performed on she data contained in the video frames of FIG. 2.

Additionally, a one-dimensional DCT is performed by the ASIC 30 on the two-dimensionally transformed spatial data to effectively produce a "temporal frequency tag" for each of the spatial transform coefficients, thereby resulting in the coefficient transforms of the video frame data shown generally in FIG. 3 at 56 and labeled w=1, w=2, etc. at 57, with w designating a discrete temporal frequency domain increment. The coefficients are quantized as described below. The discrete cosine transform function is desirable for implementation in the methods of the present invention in that it closely approximates the ideal transform known as the Karhunen Loeve transform, which is known in the signal processing art as the ideal transform for a random process with known correlation coefficients between the terms in the random process, thereby calculating answers in a mathematical optimization manner. The two-dimensional spatial DCT of the plurality of video frames is indexed by the "time tag" index t.

$$c_{uvt} = \frac{D(u)}{2}\frac{D(v)}{2}\sum_{y=o}^{N-1}\sum_{x=o}^{N-1} s(x, y, t)\cos\left[\frac{(2X+1)u\pi}{2N}\right]\cos\left[\frac{(2y+1)v\pi}{2N}\right]$$

where N is the number of pixels on one side of a pixel block, and:

$$D(u) = \frac{2}{\sqrt{N}} \text{ for } u = o;$$

$$D(v) = \frac{2}{\sqrt{N}} \text{ for } v = o;$$

$$D(u) = \frac{2\sqrt{2}}{N} \text{ for } u > o;$$

and $$D(v) = \frac{2\sqrt{2}}{N} \text{ for } v > o$$

Figure 4:
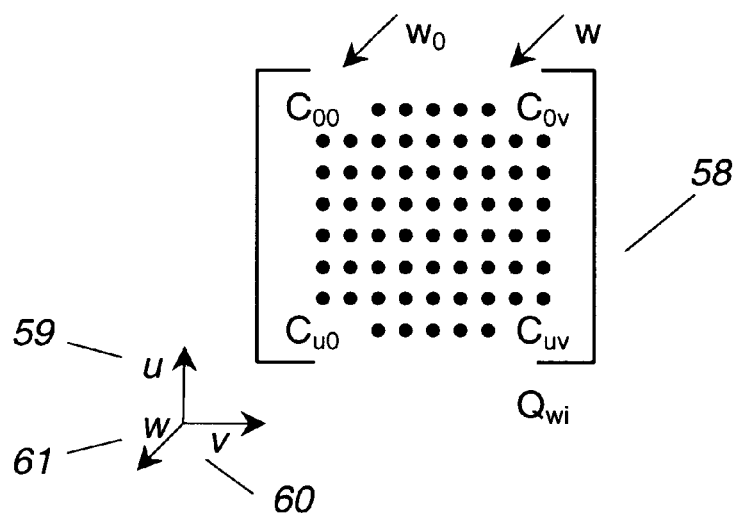
FIG. 4 illustrates a three-dimensional quantization matrix containing three-dimensional coefficients subsequent to a one-dimensional discrete cosine transform being performed on the data contained in the video frames of FIG. 2.

As shown in FIG. 4, after the one and two-dimensional transforms are performed by the ASIC 30, the resulting data for each video frame is quantized in a three-dimensional quantization matrix, shown generally at 58. Each of the resulting matrices includes eight coefficients per row, a s indicated by the arrow U at 59 in FIG. 4, eight coefficients per column, as indicated by the arrow V at 60 and temporal quantization vectors associated with each spatial coefficient in the direction represented by arrow W at 61. The three-dimensional quantization matrix is formed by multiplying the 64 $C_{UV}$ quantization coefficients from the MPEG two-dimensional spatial matrix by a temporal scaling term represented by the temporal vector elements and derived from the one-dimensional discrete cosine transform. The formula is represented as follows:

$$Q_{3D} = q_W Q_{MPEG}$$

where $q_w = (q_{w0}, q_{w1}, \ldots, q_{w7})$ is the temporal scaling term derived from the rate-distortion optimization methods described below. Thus, each matrix representing a particular video frame in the eight frame sequence includes sixty-four three-dimensional coefficients, each presented generally by the term $_{UVW}$ as shown generally in the matrix at 58. For the two-dimensional DCT, the DC value is the 0,0 term in the spatial domain and represents the average of intensities of pixels in the video frame in question. The remaining 63 coefficients, or AC values, are related to the difference between pixels in temporally successive frames.

Figure 5:
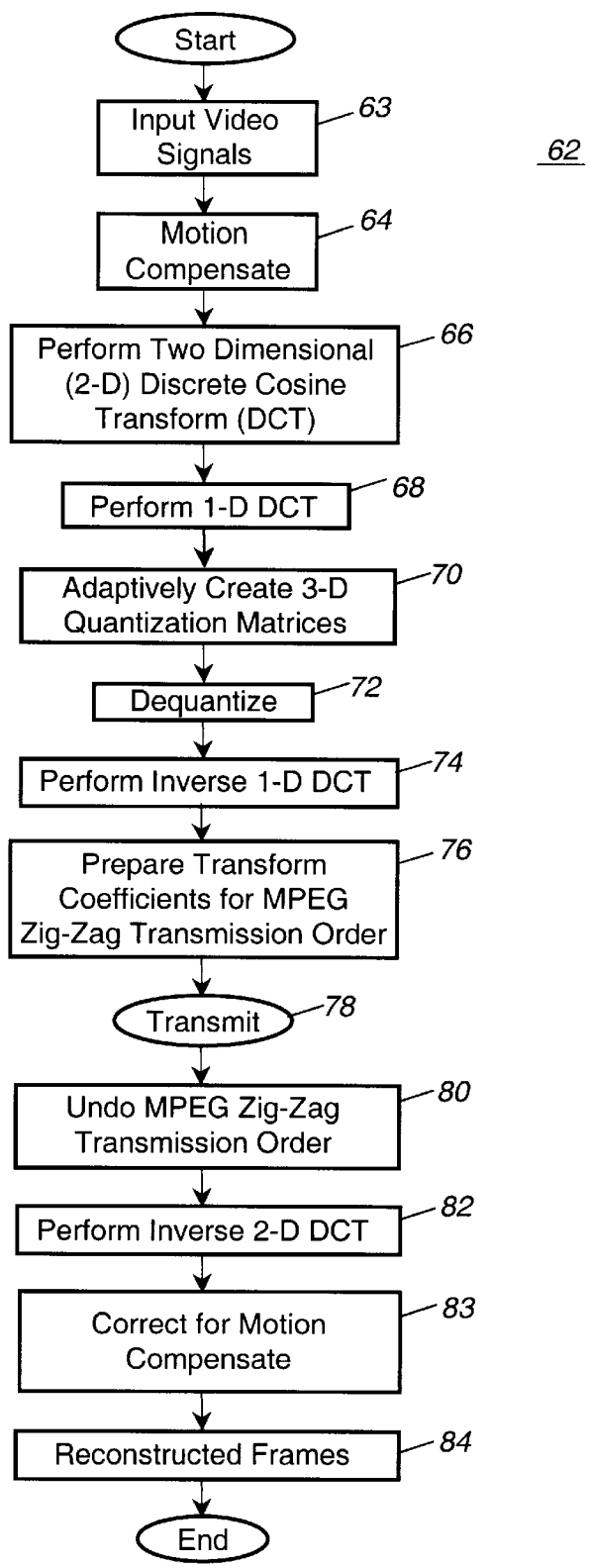
FIG. 5 is a flow diagram illustrating the preferred method of implementation of a first compression method of the present invention.

Referring to FIG. 5, a preferred method of implementing a first data compression method according to a first embodiment of the present invention is shown generally at 62 and will now be described. As shown at 63, the original sequence of video frames is input into the compressor 16. The sequence of frames is then subjected to motion compensation analysis at step 64, as is done with conventional MPEG syntax and is as well known in the art. The general mathematical representation of the motion compensation is as follows. The displacements $\Delta x_n$ and $\Delta y_n$ for motion compensation of a macroblock (16-by-16 pixels) in frame n ($s_n$) with respect to a macroblock from frame O ($S_o$) are:

$$\text{minimum}\sum_{y=o}^{15}\sum_{x=o}^{15}|S_0(x+\Delta x_n, y+\Delta y_n) - S_n(x, y)|^2$$

over all possible $\Delta x_n, \Delta y_n$ within a window of pixels in frame $S_o$.

At step 66, a two-dimensional discrete cosine transform (DCT) as described above is performed on the data contained within the frames to transform the data from the spatial position domain to the spatial frequency domain. At step 68, a one-dimensional discrete cosine transform is performed on the data in the video frames as described above in the temporal dimension to thereby produce coefficient in the temporal frequency domain. The three-dimensional discrete cosine transform group of transform coefficients are ordered as a group of eight by eight matrices, with the number of matrices equaling the number of frames used in the group of frames being processed.

Subsequent to the above discrete cosine transformations in he spatial and temporal domains being performed on the data, the processor at step 70 adaptively creates a three-dimensional quantization matrix for each groups of frames of video data in the memory 20 by determining the temporal quantization vector component that optimizes the rate at each temporal frequency.

Also at step 70, the method calculates the optimal distortion, or error, for the particular sequence of video frames being transmitted. In addition, at step 70, the optimal transmission bit rate is also calculated, as will be described in detail below. Subsequent to the optimal distortion and bit rate transmission calculations, at step 72 the method dequantized the coefficients in the matrices formed and created at step 70 by removing the temporal scaling factor $c_w$ from the coefficients. At step 74, the method performs an inverse one-dimensional DCT to remove the coefficients from the temporal domain, thereby reverting the matrix back to a two-dimensional MPEG matrix with coefficients representing the spatial position of signal data. The compression method according to the present invention dequantized the three-dimensional matrix and performs the inverse one-dimensional DCT function on the coefficients subsequent to transmission to both take advantage of the temporal compression of the three-dimensional DCT and to transmit the data in such a manner that the signal decompressor receives the intraframe coded frames in MPEG compatible form.

At step 76, the processor determines the probability of each coefficient being zero for the particular processed group of frames and arranges the coefficients accordingly in a zig-zag transmission block order utilized in conventional MPEG data compression methods. Subsequent to the coefficients being arranged in the above-described zig-zag order transmission block, the data is transmitted at step 78 to the signal decompressor 42. Subsequent to being transmitted, the zig-zag ordered block of data is reformatted at step 80 by the signal decompressor back into the two-dimensional MPEG spatial position coefficient matrix. Subsequently, at step 82, the signal decompressor processor 42 performs an inverse two-dimensional discrete cosine transform to revert the video data in the spatial frequency domain $C_{uvt}$ back to the spatial position domain $\hat{s}(x, y, t)$, $$\hat{s}(x, y, t) = \sum_{u=o}^{n-1} \frac{D(u)}{2} \sum_{v=o}^{N-1} \frac{D(v)}{2}.$$

$$C_{uvt} \cos\left[\frac{(2x+1)u\pi}{2N}\right] \cos\left[\frac{(2y+1)v\pi}{2N}\right]$$

where N is 8, the size of one side of the block of pixels, and D(u) and D(v) have been previously defined. At step 83, the method removes the motion compensation weighting from the data. At step 84, the reconstructed video frames are produced and output on the video monitor 26.

In the compression method above, it has been shown that the method may be implemented with present MPEG compatible video systems to achieve a compression rate of about 40:1, which is a significant increase when compared to tile typical 30:1 compression rate of present MPEG-2 syntax. The above described three-dimensional DCT based method temporally compresses four to eight frames of video and thus has more compression potential than the commercial standard MPEG-1 and 2 syntaxes, which typically utilize less than eight frames for optimizing temporal redundancy and uses temporal compression for only two frames at a time. After optimizing temporal compression, the MPEG compatible algorithm uncompresses the temporal dimension before data transmission, leaving a two dimensional data format that is compatible with MPEG. Transmission and compression rates are thus determined after temporal uncompress ion, or dequantization and inverse transformation, has been performed.

It should be appreciated at this point that, in the above method, the temporal scaling parameter can be chosen either to set all temporal frequency distortions at the same value or to minimize distortion for a given target rate allocated to each temporal frequency.

Figure 6:
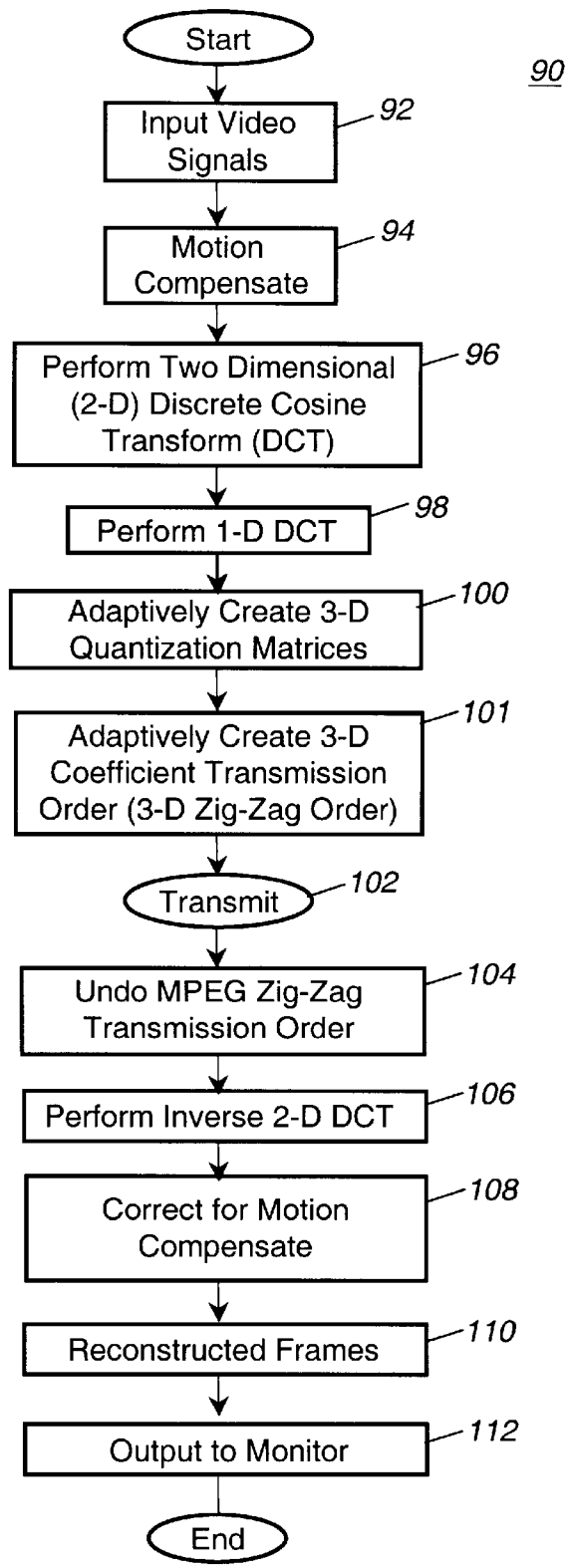
FIG. 6 is a flow diagram illustrating the preferred method of implementation of a second data compression method of the present invention.

Referring to FIG. 6, a second method of data compression according to a preferred embodiment of the present invention is illustrated through the flow diagram shown generally at 90. This second data compression method attacks the transmission order optimization after video frame coefficients have been transformed three-dimensionally, rather than use MPEG zig-zag order after the inverse temporal transformation implemented in the first data compression method DCT at step 64. At step 92, the original video frames are input into the compressor front the video signal source 12. The processor 18 initially performs motion compensation the frames at step 94. At steps 96 and 98, the method performs two-dimensional spatial and one-dimensional temporal DCT transforms, respectively, on the video data, as with the above described firs decompression method. Also, at step 100, three-dimensional quantization matrices are adaptively created, as in the earlier described first method.

However, the second method differs in that at step 11, the histogram chip 32 creates a histogram of the quantized coefficients in the three-dimensional matrices such that the method may adaptively create a three-dimensional coefficient transmission order (i.e., a three-dimensional zig-zag order) block. Thus, the histogram chip generates a histogram that is used by the compressor to transform one three-dimensional matrix into another three-dimensional matrix based on the information the histogram collects. An ordering based on increasing spatial-temporal frequency, i.e., $$\sqrt{u^2 + v^2 + w^2}$$

would be an expression of the MPEG approach to transmission order. The data compression method of the present invention improves on the MPEG method by adapting the transmission order to the probability $\tilde{C}_{uvw}=0$ and thus optimizing the three-dimensional zero run length for each group of frames. The compressed bit stream thus includes an ordering with the coefficient having the least probability of being zero being first transmitted, with the coefficients having the least probability of being zero being transmitted in increasing probability order. In the zig-zag order, the first row of the first matrix of dequantized coefficients is the column from the processed group of frames with the least number of zeros. The second row of the first matrix of the dequantized coefficients is the column from the processed group of frames with the second least number of zeros. The remaining rows of the first matrix are filled out with similar ordering regarding number of zero coefficients in a column. Rows of the second matrix are filled if there are any remaining columns with non-zero coefficients. An end of block character is transmitted after the last row in the new matrix system having a non-zero coefficient is transmitted. This minimizes the amount of data transmitted having no energy and being represented by coefficients having a zero value. The decompressor at the other end subsequently fills in zeros to the rest of the transmitted bit stream before the decompressor starts data decompression.

The MPEG-like ordering with increasing spatial-temporal frequency is lost upon data transmission due to the three-dimensional zig-zag block being transmitted, as the block must be reordered before the inverse one-dimensional transform may be performed. However, by truncating the number of zeros being transmitted in the high compression method and transmitting the data in a three-dimensional block, the zero run length is increased in two different Directions, thereby giving about a fivefold increase in compression over the MPEG compatible method.

Subsequent to the three-dimensional zig-zag order block being implemented, the matrix coefficients are transmitted at step 102. After transmitting the signal data, the method undoes the three-dimensional zig-zag transmission order block at step 104 before the inverse one-dimensional and inverse two-dimensional DCT transforms can be performed at steps 106 and 108, respectively. Subsequently, motion compensation is removed, and the video frames are reconstructed and output to the video monitor 26 at steps 110 and 112.

It should be appreciated from the foregoing that, in general, utilization of the temporal dimension quantization matrix in both the above described methods allows the compression ratio to be optimized, while at the same time maintains the amount of signal distortion at a level that is not observable to the human eye. Signal compression is thus maximized while computational complexity is minimized.

Figure 7:
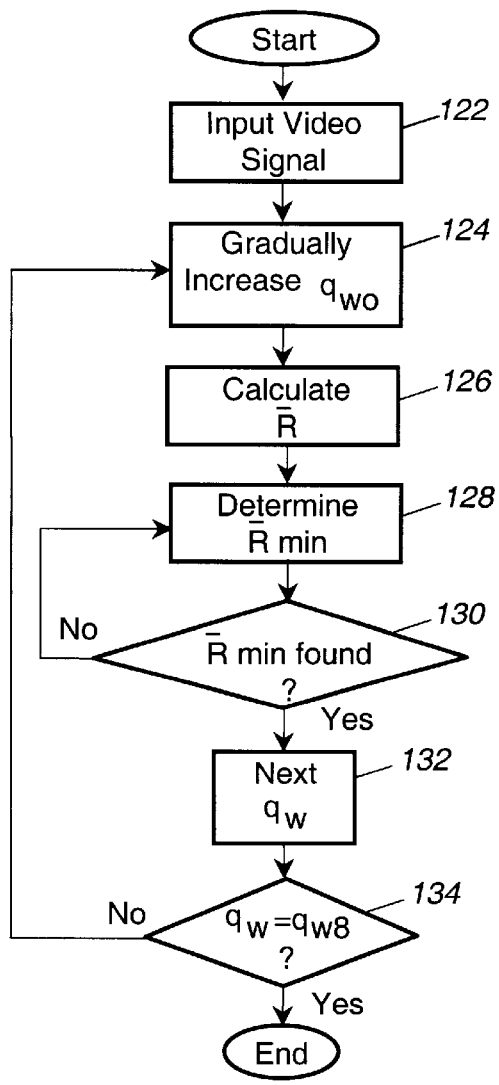
FIG. 7 is a flow diagram illustrating a preferred method of calculating the optimal transmission rate for use with the data compression methods of the present invention.

Referring now to FIG. 7, a flow diagram illustrating the transmission rate calculations performed by the above data compression methods are illustrated generally at 120. The transmission rate is calculated using entropy calculations based on pseudo-probability distribution of coefficients, and not on the actual MPEG syntax calculations. The entropy calculations slightly overestimate the transmission rate. The entropy calculation accounts for all quantized coefficients, whereas the MPEG method truncates coefficients if the coefficients exceed certain minimum or maximum limits defined by the MPEG standard. The equation for rate determination using Huffman coding is:

$$\text{Rate} \leq H(\underline{p}) + \sum_i \frac{H(p_i)}{L_i}$$

where R is the probability vector for non-zero transform coefficients, $L_i$ is the zero run length plus one and $p_i$ is the probability of a sum of i zeros. MPEG software, which is publicly available on the Internet, could be used instead of the entropy calculations.

Figure 9:
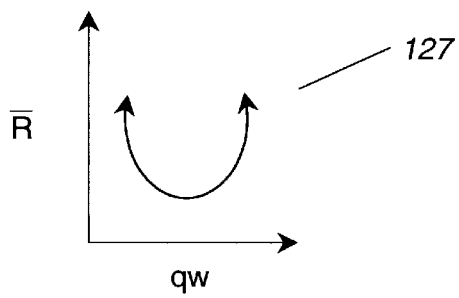
FIG. 9 is a graphical analysis of data transmission rate versus temporal frequency quantization vector weighting factor.

As shown in step 122, video signal data is input. This data correlates to the three-dimensional quantization coefficients that fill the three-dimensional quantization matrices performed at steps 60 and 98, respectively, of the above described first and second methods. At step 124, the quantizer is stepped up gradually in small increments. At each temporal frequency, a temporal quantizer scaling term is determined from optimizing rate-distortion performance at that temporal frequency. At step 126, the distortion rate $\overline{R}$ is calculated. The optimal $\overline{R}$ is calculated by plotting transmission rate versus temporal quantization component $q_w$. Such a plot results in the generation of a curve with a minimum rate value, as indicated generally at 127 in FIG. 9. At step 128, the processor determines if the minimum value for $\overline{R}$ has been found by successively choosing points on the generated curve 127. At step 130, the method determines if the processor has found the minimum value of $\overline{R}$. If the processor has found the minimum value, the value $q_w$ is set to minimize the value $\overline{R}(q_w)$. $\overline{R}$ is an approximation to the average rate for the group of frames, which is usually the rate for the first frame of a group of frames. Use of one frame to represent the rate for a group of frames is typically sufficient for rate optimization. If the minimum value is not found, the method returns to step 128 to continue searching for the minimum value of $\overline{R}$. Subsequent to step 130, the method increments to step 132, where steps 124–132 are repeated for $q_{w1}$, $q_{w2}$, . . . until the overall transmission rate for each $\overline{R}(q_w)$ has been computed for $q_{w1}$. At step 134, the method determines if the next value for $q_w$ equals $q_{w8}$. If so, the method ends until the next group of frames is compressed. If $q_{w8}$ has not been computed, the method returns to step 124 for further transmission rate computations.

Figure 8:
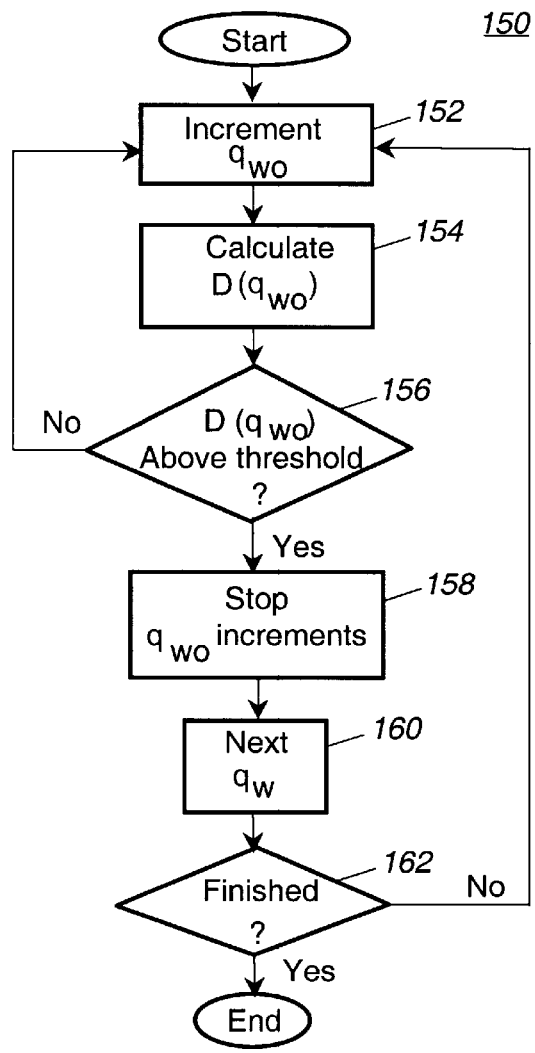
FIG. 8 is a flow diagram illustrating a preferred method of calculating the optimal distortion rate for use within the data compression methods of the present invention.

Similarly, as shown in FIG. 8, the preferred method of implementing a signal distortion optimization calculation is shown at 150. At step 152, the scaling factor $q_w$ is incremented. The distortion rate D is calculated in parallel to the transmission rate calculation at the processor 18, as is indicated at step 154. The distortion rate is calculated as:

$$D = \sum_{u,v,w} (c_{uvw} - \tilde{c}_{uvw})^2$$

As shown, the distortion rate is the square of the difference between the coefficients with and without temporal quantization vector weighing factor. The sum of each of the individual error contributions for a particular coefficient gives the total distortion error due to quantization. $\overline{R}$ is an estimate to the true compressed rate; it is a performance metric used to set the terms in the temporal quantization vector during rate optimization procedure. $\overline{R}$ is calculated in the following way. A set of quantized coefficients at a $q_w$ value is made, and the three-dimensional quantized coefficients are temporally dequantized and inverse one-dimensional DCT transformed. The rate for a frame is then determined and set equal to $\overline{R}$. This process repeats until the minimum $\overline{R}$ is set for each temporal frequency.

At step 156, the method determines if D ($q_w$) is above the threshold of the human visual system. If the distortion is above the threshold, the method returns to step 1.52 and the distortion is calculated until the value of D($q_w$) is above the threshold of human visualization. When the value is such, the $q_w$ iteration is stopped as indicated at step 158.

At step 160, the distortion rate for the next spatial transmission matrix for the next video frame is calculated. At step 162 the method determines if D ($q_w$) has been computed for all values of w from w=0 to w=7 assuming that a group consisting of eight video frames is being compressed. If the method is finished, the method ends until the data from the next group of frames is entered for processing. If the method is not finished, the method returns to step 152 to continue calculating the distortion rate for the next $q_w$.

It should be appreciated at this point that it has been observed that typically only $q_{w0}$ and $q_{w1}$ actually have a measurable effect on the distortion rate and bit rate transmission calculations for the methods of the present invention. Thus, the values for $q_{w2}$ through $q_7$ could be set at default values to further simplify the above-described data compression methods. It should also be appreciated that the rate/distortion sequence of the compression methods of the present invention could be enhanced by optimizing both the DC and AC coefficients separately. The rate/distortion optimization method could also be enhanced by using the range multiplier method.

From the foregoing explanation, it should be appreciated that the video signal compression methods of the present invention provide methods for compressing digital video signals in a manner that achieves high bit rate transmission with minimal detected distortion. The methods of the present invention maximize use of temporal compression through temporal redundancy and thereby minimize the number of quantization variables required for data compression and thus the complexity of the data compression operation. The data compression methods of the present invention exhibit increased compression ratios when compared to present MPEG-1 and MPEG-2 based data compression methods while at the same time minimize data compression complexity.

Various other advantages of the present invention will become apparent to those skilled in the art after having the benefit of studying the foregoing text and drawings, taken in conjunction with the followings claims.

What is claimed is:

1. A method of compressing video signal data, comprising the steps of:

providing a signal compressor for performing video compression operations;

inputting video signal data including a plurality of video frames into said signal compressor;

performing a three-dimensional transformation of said video signal data from spatial and temporal position domains to a frequency domain; including performing a two-dimensional discrete cosine transformation of video signal data in a spatial location domain to a spatial frequency domain; and performing a one-dimensional transformation of video signal data in a temporal location domain to scale said video signal data in said temporal domain;

creating a plurality of three-dimensional quantization matrices, each matrix containing two-dimensional quantization coefficients corresponding to data from one of said video frames in said video signal, each of said plurality of matrices including a third dimension in which a temporal quantization vector is associated with each of said two-dimensional quantization coefficients;

calculating maximum transmission rate and optimal signal distortion parameters for each of said plurality of video frames from said quantization matrices; the steps of performing a two-dimensional discrete cosine transformation, a one-dimensional discrete cosine transformation, and creating a plurality of three-dimensional quantization matrices, being effective to compensate for motion in said video signal prior to data transmission, thereby minimizing data being transmitted; and creating a three-dimensional zig-zag order transmission block from said data in said quantization matrices for data transmission.

2. The method of claim 1, further comprising the steps of:

transmitting said zig-zag order transmission block; undoing said zig-zag order transmission block; and reconstructing said original video frames from said transmitted data.

3. The method of claim 2, wherein said step of reconstructing said video frames comprises performing inverse transformations of said spatial and said temporal video signal data to reconstruct said video signal data into said original plurality of video frames.

4. A system for transmitting video signal data, comprising:

a signal generator for generating video signals;

a signal input for receiving a video signal containing a plurality of frames of video data from said signal generator;

a video signal compressor, comprising:

a processor for performing both a two-dimensional discrete cosine transform of spatial location data to spatial frequency data and a one-dimensional discrete cosine transform of temporal location data to temporal frequency data;

said processor having an associated memory, said processor loading said transformed data into quantization matrices in said memory and performing signal distortion and transmission rate optimization calculations based on said transformed data in said quantization matrices; thereby compensating for motion in the plurality of frames of video data and thereby decreasing the amount of data necessary for transmission;

said processor subsequently formatting said transformed, quantized data into a three-dimensional zig-zag order block for transmission subsequent to performing said signal distortion and transmission rate optimization calculations;

a transmitter for transmitting said three dimensional zig-zag order block; and a signal decompressor for receiving said zig-zag order block from said transmitter and for reconstructing said original video frames from said zig-zag order block.

5. A method of transmitting a digital video signal, comprising the steps of:

discrete cosine transforming two-dimensional spatial video signal information; discrete cosine transforming one-dimensional temporal video signal information;

quantizing said spatially and temporally transformed digital video signal information to calculate optimal transmission and signal distortion; rates creating a plurality of three-dimensional quantization matrices, each matrix containing two-dimensional quantization coefficients corresponding to data from one of the video frames in said video signal, each of said plurality of matrices including a third dimension in which a temporal quantization vector is associated with each of said two-dimensional quantization coefficients;

entropy coding said three-dimensional quantized video signal information;

transmitting said entropy coded three-dimensional quantized digital video signal information; and reconstructing said original digital video signal information from said transmitted entropy-coded three-dimensional quantized digital video signal information said steps of discrete cosine transforming two-dimensional spatial video signal information, discrete cosine transforming one-dimensional temporal video signal information, quantizing said spatially and temporally transformed digital video signal information being performed prior to said step of transmitting said video signal information to compensate for motion in said video signal information in lieu of computing and transmitting motion compensation vectors.

6. The me hod of claim 5, wherein said step of reconstructing said original video signal information comprises the steps of:

subsequent to said step of transmitting said quantized information, dequantizing said information; and inverse transforming said spatially transformed information.

* * * * *